United States Patent [19]

Eicoff

[11] Patent Number: 5,694,884

[45] Date of Patent: Dec. 9, 1997

[54] RETAINING BARRIER ATTACHMENT FOR ANIMAL CAGES

[76] Inventor: Jefferey Eicoff, 1613 York Ct., Mundelein, Ill. 60060

[21] Appl. No.: 753,020

[22] Filed: Nov. 19, 1996

[51] Int. Cl.[6] ............................................. A01K 31/00
[52] U.S. Cl. ............................................. 119/469; 119/470
[58] Field of Search ................................. 119/469, 470; 47/23; 604/179; 128/856, 849

[56] References Cited

U.S. PATENT DOCUMENTS

| | | | |
|---|---|---|---|
| 98,562 | 1/1870 | Colburn | 119/469 |
| 1,514,624 | 11/1924 | Leon | 119/469 |
| 1,539,583 | 5/1925 | Lindemann | 119/469 |
| 1,600,892 | 9/1926 | Kruczek | 119/469 |
| 2,968,281 | 1/1961 | McCauley | 119/469 |
| 3,029,788 | 4/1962 | Voss | 119/469 |
| 3,989,040 | 11/1976 | Lotgren et al. | 128/856 |
| 4,036,220 | 7/1977 | Bellasalma | 128/856 |
| 4,901,472 | 2/1990 | Donohue et al. | 47/23 |
| 5,188,608 | 2/1993 | Fritts | 119/179 |
| 5,403,285 | 4/1995 | Roberts | 604/179 |
| 5,488,931 | 2/1996 | Grosman | 119/476 |

*Primary Examiner*—Paul J. Hirsch
*Attorney, Agent, or Firm*—Hill, Steadman & Simpson

[57] ABSTRACT

A retaining skirt or barrier is provided for animal cages. A skirt comprising a sheet, preferably made from a clear plastic or polymer material, is provided that can be wrapped around the bottom portion of an animal cage. The two ends of the skirt can be detachably and adjustably connected to one another so that a skirt of a single length can be utilized on animal cages of varying sizes.

2 Claims, 1 Drawing Sheet

RETAINING BARRIER ATTACHMENT FOR ANIMAL CAGES

FIELD OF THE INVENTION

The present invention relates to the care and maintenance of animal cages, such as bird cages. More specifically, the present invention relates to an apparatus and method for retaining waste, food and other debris within an animal cage.

BACKGROUND OF THE INVENTION

A number of animals that serve as pets are housed within a cage or other ventilated housing apparatus. Because a typical cage, such as a bird cage, is fabricated from a plurality of spaced bars that extend the length of the cage and which are supported by a plurality of cross bars, the cage provides a ventilated housing structure for the animal which allows air to freely pass through the bars of the cage to the animal.

Unfortunately, in addition to permitting air to pass through the cage, the spaced bars of a cage also permit food particles, animal waste and other debris, such as bird feathers, to pass from the inside of the cage to the outside of the cage. This occurrence is annoying to pet owners who are required to place newspaper or other protective materials underneath the cage or who are frequently forced to clean the floor beneath the cage. Specifically, in the case of hanging bird cages or bird cages that are supported above the floor on a pedestal, debris including feathers, food particles such as seed shells and bird waste are often flung by the bird or birds through the bars of the cage and onto the floor. If the floor is carpeted, frequent shampooing of the carpet is often necessary. In any event, frequent cleaning or vacuuming of the floor is required. For cages that house more than one bird or animal, the problem is compounded because the birds or animals tend to play or fight with one another which often results in debris being thrown from the cage.

To solve this problem, a stretchable fabric in the form of a sock or skirt has been provided that is mounted onto the cage by stretching the sock or skid over the bottom or top of the cage and sliding it in place adjacent to the bottom of the cage. However, this specific type of sock or skirt is unsuitable for a variety of reasons. First, animal waste tends to stick to the stretch fabric that the sock or skid is fabricated from. Accordingly, during even short periods, the sock or skid becomes stained or soiled with animal waste and presents a very unsightly appearance. It must be frequently removed from the cage and washed and dried. Because the sock or skid is made from fabric, did and debris cannot be simply wiped off with a damp sponge or towel.

Second, the stretchable-type socks or skirts are difficult to mount onto the cage. Specifically, for bird cages that are suspended from the ceiling or that are supported by an overhanging arm structure, the sock or skid must be stretched and pulled up and over the bottom of the cage. For larger bird cages, this is difficult to accomplish and results in a swinging or shaking of the cage which is disruptive to the birds or animals contained within the cage. The same is true for the cages which require the sock or skid to be stretched and fitted over the top of the cage and slid down the side walls toward the bottom of the cage.

Third, because the stretchable-type socks or skirts are made from a fabric, they are not entirely see-through and not only affect the appearance of the cage, but also affect the ability to see the animals contained within the cage. Still further, because cages come in a variety of sizes, the stretchable sock-type cages must also be provided in a variety of sizes. Hence, manufacturers must manufacture a variety of sizes and pet store owners must also stock a variety of sizes to meet demand.

Accordingly, there is a need for an improved retaining attachment or barrier for animal cages that addresses and solves the aforenoted problems.

SUMMARY OF THE INVENTION

The above problems are addressed by a retaining skirt fabricated in accordance with the present invention. The skid of the present invention is fabricated from a two-sided sheet that includes a first end and a second end. The first and second ends of the sheet include an attachment means for detachably and adjustably attaching the first and second ends of the sheet together so that the retaining skirt may be mounted onto the cage by simply wrapping the sheet around the cage and attaching the second end of the sheet to the first end of the sheet.

In an embodiment, the sheet is two-sided with an inward-facing side and an outward-facing side. After the sheet is wrapped around the cage, the inward-facing side at the second end of the sheet is attached to the outward-facing side of the first end of the sheet.

In an embodiment, the first and second ends of the sheet include a VELCRO attachment system. For example, the outward-facing side of the first end of the sheet includes one half of a VELCRO attachment system such as a plurality of looped members and the inward-facing side of the second end of the sheet includes the second half of the VELCRO attachment system, namely a plurality of hooked members. As the sheet is wrapped around the cage, the first end of the sheet is held against the cage so that the second end of the sheet may be pressed against the first end of the sheet after the sheet has been wrapped around the cage.

In an embodiment, the sheet is made from a clear plastic material.

In an embodiment, the sheet includes a border material attached along both side edges of the sheet as well as along the first and second ends of the sheet.

In an embodiment, the VELCRO attachment system is mounted to the first and second ends of the sheet along the side edges of the sheet adjacent to the first and second ends of the sheet.

In an embodiment, the retaining skirt of the present invention comprises a clear plastic sheet with a border material sewn onto the side edges and first and second ends of the sheet. One half of a VELCRO attachment system is attached to the side edges disposed adjacent to the first end of the sheet at the outward-facing side of the sheet. A second half of a VELCRO attachment system is attached to the side edges adjacent to the second end of the sheet at the inward-facing side of the sheet. Accordingly, the first end of the sheet is held against the cage and the second end of the sheet is wrapped around the cage until it is disposed over the outward-facing side of the first end of the sheet and the inward-facing side of the second end of the sheet is pressed onto the outward-facing side of the first end of the sheet for a detachable and adjustable connection.

It is therefore an object of the present invention to provide an improved see-through retaining skirt for animal cages.

It is also an object of the present invention to provide an improved see-through retaining skirt for animal cages with a detachable and length-adjustable connection.

Still another object of the present invention is to provide an improved retaining skirt for animal cages which includes a non-porous surface which can be cleaned by wiping with a damp sponge or cloth.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiment illustrated in greater detail and the accompanying drawings and described below by way of an example of the invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
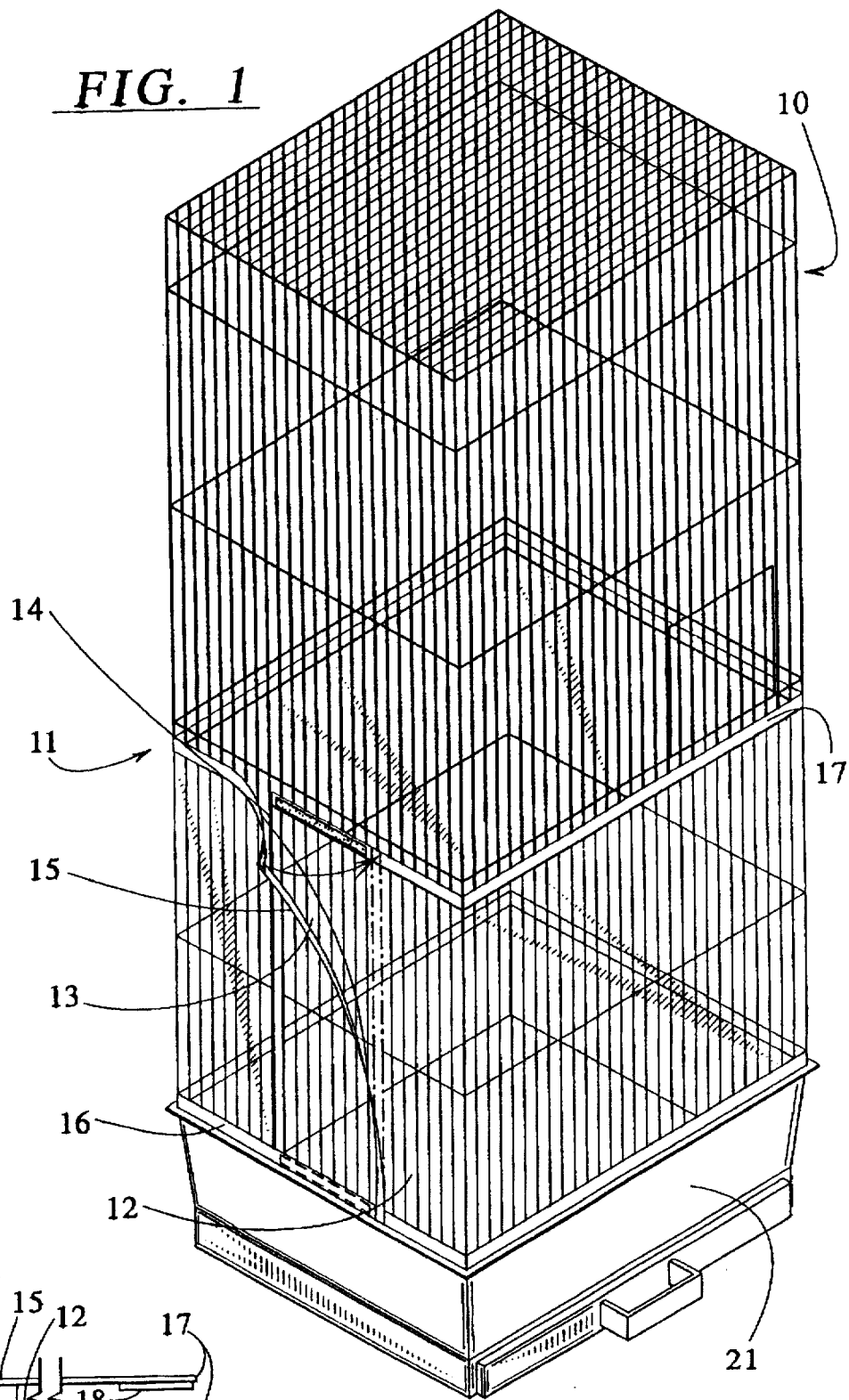
FIG. 1 is a perspective view of an animal cage equipped with a retaining skirt made in accordance with the present invention.

FIG. 1 illustrates a bird cage 10 that is equipped with a retaining skirt 11. The retaining skirt 11, in the embodiment illustrated in FIG. 1, is fabricated from a clear material, such as a clear plastic. A clear plastic is preferred because it does not interfere with the pet owner's ability to view the pet contained within the cage 10 when the pet is disposed behind the skid 11. The main portion of the skid 11 should also be fabricated from a flexible material, which makes it easy to wrap the skirt 11 around the cage 10. A suitable flexible material is low density polyethylene or vinyl. Other suitable, clear materials will be apparent to those skilled in the art.

The skirt 11 is two-sided and, for purposes of illustration, will be described as including an outward-facing side 12 and an inward-facing side 13. The skirt 11 also includes a first end 14 and a second end 15. As shown in FIG. 1, the outward-facing side 12 of the first end 14 of the skirt 11 is attached to the inward-facing side 13 of the second end 15. This connection is described in greater detail in FIG. 2.

Figure 2:
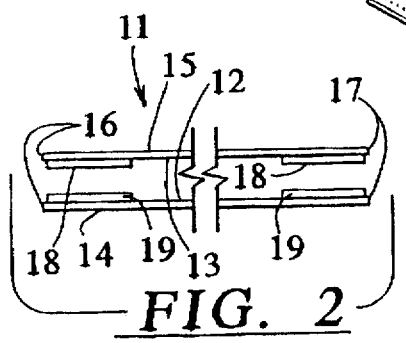
FIG. 2 is a partial end view of the retaining skirt shown in FIG. 1.

As illustrated in FIG. 2, the second end 15 of the skirt 11 is disposed above the first end 14 of the skirt 11. To connect the second end 15 to the first end 14, a VELCRO connection system is provided at the outer edges 16 and 17 of the skirt 11. Specifically, at the inward-facing side 13 adjacent to the second end 15, a plurality of hook members shown schematically at 18 are attached in strip-form along the side edges 16, 17. Similarly, at the outward-facing side 12 adjacent to the first end 14, a plurality of VELCRO loop-type structures shown schematically at 19 are attached in strip form to the side edges 16, 17 adjacent to the first end 14. In this manner, the outward-facing side 12 adjacent to the first end 14 of the skirt 11 can be attached to the inward-facing side 13 adjacent to the second end 15 of the skirt 11 as shown in FIG. 1.

The correct positioning of the skirt 11 is also illustrated in FIG. 1. Specifically, one edge, such as 16, should be disposed immediately adjacent to the bottom structure 21 of the cage 10. In this manner, no gap space is present between the edge 16 and the bottom structure 21 which would enable waste, food particles or debris to pass through. Further, the skirt 11 may be provided in a variety of widths. It has been found that a width covering from about ¼ to about ½ of the cage is preferable and will effectively retain food particles, waste and other debris. The width of the skirt 11 may also depend upon the specific animal that is encaged. For birds, a larger width may be desired; for rodents, a smaller width may be satisfactory. For larger animals, such as monkeys, a larger width would be desired.

The present invention also lends itself to an improved method of retaining waste, food particles and other debris within an animal cage. The method comprises the step of wrapping the sheet 11 around the exterior of the cage 10 and, simultaneously, aligning one edge 16 of the sheet 11 with the bottom 21 of the cage 10 before attaching the second end of the sheet to the first end of the sheet as illustrated in FIG. 1.

The skirt 11 of the present invention can be easily cleaned. The skirt needs only to be simply removed from the bird cage 10 and wiped off with a damp sponge or cloth. It can then, as discussed above, be easily re-mounted onto the cage 11. No washing of the skirt 11 in a washing machine is required and the plastic material from which the sheet is fabricated from will not be stained or soiled.

From the above description, it is apparent that the objects of the present invention have been achieved. While only certain embodiments have been set forth, alternative embodiments and various modifications will be apparent from the above description to those skilled in the art. For example, a VELCRO attachment system need not be employed. Instead, a plurality of snaps could be disposed along the side edges 16, 17 or along the first and second ends 14, 15. In addition, clips could be used to attach the first and second ends 14, 15. Further, a variety of materials can be used to fabricate the sheet. In addition to low density polyethylene or vinyl, materials made from polypropylene and other polymers can be utilized. Further, the material used as a border along the edges 16, 17 and ends 14, 15 may be made from a variety of fabrics. Preferably, a woven polyester nylon fabric is employed because it is easily washable.

From the above description it is apparent that the objects of the present invention have been achieved. While only certain embodiments have been set forth, alternative embodiments and various modifications will be apparent from the above description to those skilled in the art.

What is claimed is:

1. A skirt for retaining waste, food particles and other debris within a ventilated animal cage having an exterior and a bottom, the skirt comprising:

a pliable clear plastic sheet fabricated from the group consisting of low density polyethylene and vinyl the sheet further comprising an inward-facing side, an outward-facing side, a first end, a second end and two side edges extending from the first end to the second end, the inward facing side of the sheet and the outward-facing side of the sheet comprising an attachment means for detachably attaching the outward-facing side adjacent to the first end of the sheet to the inward-facing side adjacent to the second end of the sheet so that the sheet may be mounted to the exterior of the cage by wrapping the sheet around the exterior of the cage and attaching the inward-facing side adjacent to the second end of the sheet to the outward-facing side adjacent to the first end of the sheet such that sufficient tension on the sheet when wrapped around the exterior of the cage creates friction between the inward-facing side of the sheet and the exterior of the cage capable of holding the sheet in place, and wherein the attachment means for detachably attaching the outward-facing side adjacent to the first end of the sheet to the inward-facing side adjacent to the second end of the sheet comprises a plurality of hook elements disposed along the side edges of the outward-facing side or the inward-facing side adjacent to the first end of the sheet and a plurality of loop elements disposed along the side edges of the other of the outward-facing side or inward-facing side adjacent to the second end of the sheet.

2. A method of retaining waste, food particles and other debris within a ventilated animal cage, the method comprising the following steps:

wrapping a pliable, clear plastic sheet around the exterior of the cage adjacent to the bottom of the cage, the sheet fabricated from the group consisting of low density polyethylene and vinyl, the sheet further the sheet comprising a first end, a second end and two side edges, the second end and the first end of the sheet comprising an attachment means for detachably attaching the second end of the sheet to the first end of the sheet, wherein the attachment means for detachably attaching the outward-facing side adjacent to the first end of the sheet to the inward-facing side adjacent to the second end of the sheet comprises a plurality of hook elements disposed along the side edges of the outward-facing side or the inward-facing side adjacent to the first end of the sheet and a plurality of loop elements disposed along the side edges of the other of the outward-facing side or inward-facing side adjacent to the second end of the sheet, aligning one side edge of the sheet with the bottom of the cage, attaching the second end of the sheet to the first end of the sheet such that sufficient tension on the sheet when wrapped around the exterior of the cage creates friction between the inward-facing side of the sheet and the exterior of the cage capable of holding the sheet in place.

* * * * *